(12) United States Patent
Dobbelaere

(10) Patent No.: US 11,003,494 B2
(45) Date of Patent: May 11, 2021

(54) METHOD AND DEVICE FOR SCHEDULING OF DATAFLOW COMPONENTS

(71) Applicant: Alcatel Lucent, Boulogne-Billancourt (FR)

(72) Inventor: Philippe Dobbelaere, Antwerp (BE)

(73) Assignee: Alcatel Lucent, Boulogne-Billancourt (FR)

(*) Notice: Subject to any disclaimer, the term of this patent is extended or adjusted under 35 U.S.C. 154(b) by 143 days.

(21) Appl. No.: 16/324,544

(22) PCT Filed: Aug. 7, 2017

(86) PCT No.: PCT/EP2017/069899
§ 371 (c)(1),
(2) Date: Feb. 8, 2019

(87) PCT Pub. No.: WO2018/029132
PCT Pub. Date: Feb. 15, 2018

(65) Prior Publication Data
US 2019/0171484 A1    Jun. 6, 2019

(30) Foreign Application Priority Data

Aug. 9, 2016 (EP) .................................. 16306034

(51) Int. Cl.
| | |
|---|---|
| *G06F 9/48* | (2006.01) |
| *G06F 9/50* | (2006.01) |
| *G06F 9/54* | (2006.01) |
| *G06F 11/34* | (2006.01) |
| *G06F 11/30* | (2006.01) |
| *H04L 12/825* | (2013.01) |

(52) U.S. Cl.
CPC .......... *G06F 9/4881* (2013.01); *G06F 9/5011* (2013.01); *G06F 9/5038* (2013.01);
(Continued)

(58) Field of Classification Search
None
See application file for complete search history.

(56) References Cited

U.S. PATENT DOCUMENTS 7,072,295 B1    7/2006 Benson et al.
7,814,222 B2 *  10/2010 Venables ............... H04L 47/263
                                              709/232
(Continued)

OTHER PUBLICATIONS

Ersfolk et al. "Scheduling of Dynamic Dataflowprograms With Model Checking", 2011 IEEE, pp. 37-42.*
(Continued)

*Primary Examiner* — Van H Nguyen
(74) *Attorney, Agent, or Firm* — Mintz Levin Cohn Ferris Glovsky and Popeo, P.C.

(57) ABSTRACT

Method and device for scheduling of dataflow components Embodiments relate to a method for scheduling dataflow components (6), executed by a scheduling device (4), comprising repeating the following steps for successive increasing input message rates ($1/\beta$): —applying (S1) an ingress message flow (F1) at an ingress message rate ($1/\beta$) to a distributed dataflow comprising at least one dataflow component (6) executed by respective processing devices (5), —determining (S2) a total latency ($\Delta t$) of at least one of dataflow component (6), and —determining (S3) a serving rate ($\mu$) associated with said ingress message rate ($1/\beta$) for said at least one dataflow component (6), in function of said ingress message rate ($1/\beta$) and said total latency ($\Delta t$), until the scheduling device (4) is unable to determine a serving rate ($\mu$) associated with the ingress message rate ($1/\beta$), thereby determining a maximum serving rate for said at least one dataflow component (6).

10 Claims, 1 Drawing Sheet

(52) U.S. Cl.
CPC ............ *G06F 9/5072* (2013.01); *G06F 9/546* (2013.01); *G06F 11/3006* (2013.01); *G06F 11/3414* (2013.01); *G06F 11/3447* (2013.01); *H04L 47/25* (2013.01); *G06F 2201/805* (2013.01)

(56) References Cited

U.S. PATENT DOCUMENTS

| | | | | |
|---|---|---|---|---|
| 8,914,471 | B2* | 12/2014 | Pazos | H04H 20/426 |
| | | | | 709/219 |
| 9,071,984 | B1* | 6/2015 | Vivanco | H04W 28/0231 |
| 9,424,315 | B2* | 8/2016 | Chamdani | G06F 9/4881 |
| 2007/0074217 | A1* | 3/2007 | Rakvic | G06F 9/3851 |
| | | | | 718/102 |
| 2008/0005392 | A1 | 1/2008 | Amini et al. | |

OTHER PUBLICATIONS

Yviquel et al. "Efficient Multicore Scheduling of Dataflowprocess Networks", 2011 IEEE, pp. 198-203.*

Dardaillon et al. "A Compilation Flow for Parametric Dataflow: Programming Model, Scheduling, and Application to Heterogeneous MPSoC", 2014 ACM, 10 pages.*

Fu, et al., DRS: Dynamic Resource Scheduling for Real-Time Analysis Over Fast Streams, 2015 IEEE 35$^{th}$ International Conference on Distributed Computing Systems, 2015, pp. 411-420.

* cited by examiner

METHOD AND DEVICE FOR SCHEDULING OF DATAFLOW COMPONENTS

CROSS REFERENCE TO RELATED APPLICATIONS

This application is a national-phase entry of Patent Cooperation Treaty Application No. PCT/EP2017/069899 filed Aug. 7, 2017, entitled "METHOD AND DEVICE FOR SCHEDULING OF DATAFLOW COMPONENTS," which claims priority from European Patent Application No. 16306034.6 filed on Aug. 9, 2016, entitled "METHOD AND DEVICE FOR SCHEDULING OF DATAFLOW COMPONENTS," the contents of which are hereby incorporated by reference in their entirety.

FIELD OF THE INVENTION

The present invention relates to the field of distributed computing. In particular, the present invention relates to methods and devices for job scheduling of dataflow components.

BACKGROUND

Existing distributed computing platforms allow deploying applications and queries that have a dataflow architecture, where any number of input streams with a particular distribution of message sizes and message rates send data to processing nodes. These nodes can then process the incoming data, and send resulting streams downstream the flow. Finally, one or more result streams are produced that are sent back to the outside world. Such platforms include technology to group processing logic according to functionality, and map it on the processing nodes.

In this context, job scheduling comprises assigning processing devices to processing components. Known scheduling solutions for distributed systems assume that the resource needs for a scheduled component are known. In practice, this is hard to measure if an application runs distributed over multiple resources (and even harder if the actual partitioning over these resources can be dynamic due to optimization). Furthermore, they do not give any insight how the system will behave under varying processor utilization, and leave the choice of maximum utilization open to configuration. It is therefore difficult to guarantee soft-real-time requirements (meaning essentially that in the absence of element failures and when input streams are within limits, the system can guarantee an end-to-end latency where the mean value is small—order of magnitude [10,100] ms—and the standard deviation negligible) without relying on over-provisioning.

SUMMARY

It is thus an object of embodiments of the present invention to propose a method and a device for scheduling dataflow component, which do not show the inherent shortcomings of the prior art.

Accordingly, embodiments relate to a method for scheduling dataflow components, executed by a scheduling device, comprising repeating the following steps for successive increasing input message rates:

applying an ingress message flow at an ingress message rate to a distributed dataflow comprising at least one dataflow component executed by respective processing devices, determining a total latency of at least one of dataflow component, and determining a serving rate associated with said ingress message rate for said at least one dataflow component, in function of said ingress message rate and said total latency, until the scheduling device is unable to determine a serving rate ($\mu$) associated with the ingress message rate, thereby determining a maximum serving rate for said at least one dataflow component.

Correspondingly, embodiments relate to a scheduling device for scheduling dataflow components, comprising means configured for executing said method.

In some embodiments, the maximum serving rate is the last serving rate determined before the scheduling device is unable to determine a serving rate.

Determining a total latency may comprise identifying an input message associated with an output message of said at least one dataflow component, and determining a time lapse between the input message and the output message.

Some embodiments comprise selecting an ingress message rates equals to the serving rate associated with the previous ingress message rates.

Determining said serving rate may comprise solving an equations system modeling the total latency as a sum of a queuing latency and a processing latency in a D/M/1 queuing system.

Some embodiments comprise scheduling a dataflow component in function of the determined maximum serving rate.

Scheduling a dataflow component may comprise:
determining a processor utilization of the dataflow component in function of the determined maximum serving rate, and
selecting a processing device such that a sum of the current processor utilization of the processing device and the determined processor utilization of the dataflow component is below a predetermined threshold.

Embodiments also relate to a computer program comprising instructions for performing the method mentioned before when said instructions are executed by a computer.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
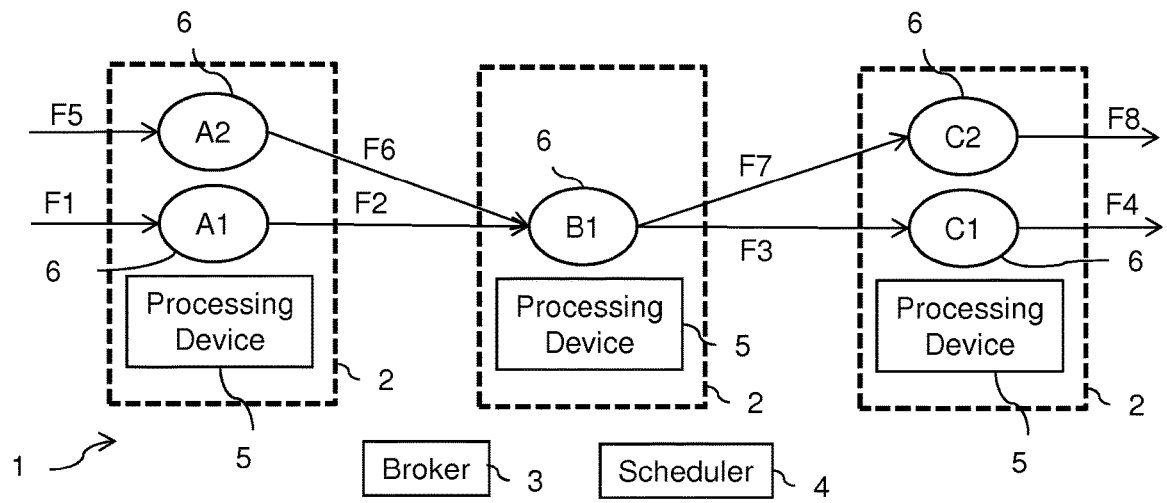
FIG. 1 is a block diagram of a system for dataflow processing.

FIG. 1 is a block diagram of a system for dataflow processing. The system comprises a plurality of processing nodes 2, a data broker device 3 and a scheduling device 4.

A processing node 2 comprises a processing device 5 and one or more dataflow component 6 deployed on said processing devices 5.

A processing device 5 comprises hardware computing resources, such as a processor, memory, network interface . . . and software resources for providing an execution environment using the hardware computing resources, such as an operating system, a virtual machine OS . . . .

A dataflow component 6 comprises a software module executed by the processing device 5, which processes an input flow of messages and produce an output flow of messages. Example of dataflow components 6 include nodejs modules, python objects, lua scriptable components, in addition to components that perform specific functions and can be written in environments such as C++ or java . . . .

In the illustrated example, a first processing device 5 executes dataflow components 6 denoted A1 and A2, a second processing device 5 executes dataflow component 6 denoted B1, and a third processing device 5 executes dataflow components 6 denoted C1 and C2.

The data broker device 3 is responsible for managing the message flows between dataflow components 6. For example, the data broker device 3 receive the output flow from one dataflow component 6 and sends it as input flow to the appropriate following dataflow component 6. This data broker is a logical function—implementations such as OMQ exist that can replace this logical function with minimal logic if e.g. both components run on a shared memory environment (e.g. the same computer). On FIG. 1, arrows illustrate a first dataflow comprising ingress flow F1 to A1, flow F2 from A1 to B1, flow F3 from B1 to C1, and egress flow F4, and a second dataflow comprising ingress flow F5 to A2, flow F6 from A2 to B1, flow F7 from B1 to C2, and egress flow F8. Although not illustrated, these messages flows pass through the data broker device 3.

The scheduling device 4 is responsible for assigning processing device 5 to respective dataflow components 6. Various selection criteria may be used for selecting a processing device 5 such as resources availability, latency, priority rules . . . . A method for scheduling dataflow components 6, executed by the scheduling device 4, is described with reference to FIG. 2.

Figure 2:
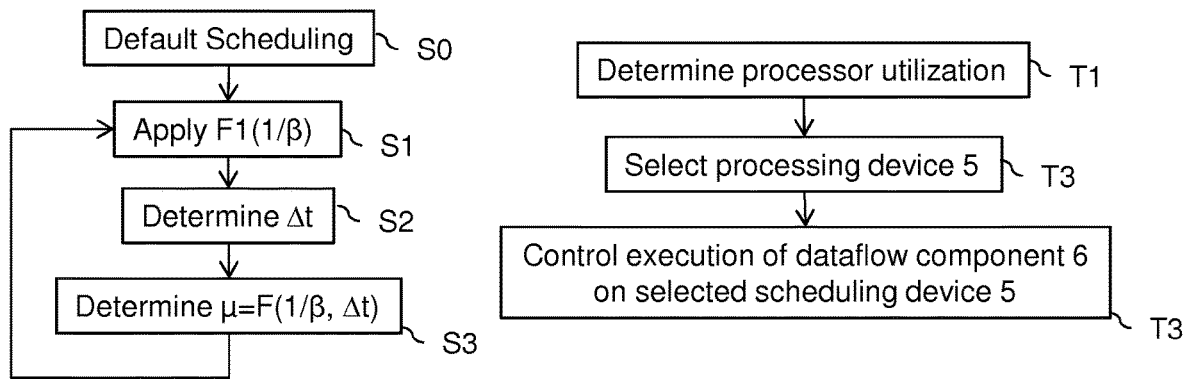
FIG. 2 is a flowchart of a method for scheduling dataflow components.

FIG. 2 is a flowchart of a method for scheduling dataflow components 6, executed by the scheduling device 4.

Let's assume a dataflow comprising successive dataflow components 6, for example A1, B1 and C1 as in FIG. 1. First, in a characterization phase, the scheduling device 4 determines, for one or more of the dataflow components 6, a maximum serving rate $\mu_{max}$. Then, in a scheduling phase, the scheduling device 4 schedules the dataflow components 6 based on the determined maximum serving rate $\mu_{max}$. The left part of FIG. 2 (steps S0 to S3) illustrates the characterization phase and the right part of FIG. 2 (steps T1 to T3) illustrates the scheduling phase.

In the characterization phase, initially, the scheduling device 4 applies a default scheduling (step S0) which does not take serving rates into account. For example, the scheduling device 4 selects processing devices 5 for the respective dataflow components 6 based on processor availability.

Then, the scheduling device 4 applies an ingress flow F1 having a constant message size and a given message rate 1/β to the dataflow (step S1). For example, the scheduling device 4 sends instructions to the data broker device 3 specifying the message size and message rate 1/β.

Then, for at least one of the dataflow components 6, the scheduling device 4 determines a total latency Δt (step S2). This can be performed for example by tracing the message flow just before and just after a dataflow component 6. For respective output message, the corresponding input message is identified and the time lapse between input and output is determined. The total latency Δt of the dataflow component 6 is determined in function of the respective time lapses, for example by calculating a mean value. Since the system 1 uses a broker architecture to link the individual dataflow components 6 together, instrumenting the data broker device 3 to accomplish this tracing is a way to be able to measure the total latency of any dataflow component 6, regardless of its type.

Then, the scheduling device 4 determines a serving rate p associated with the ingress message rate 1/β, for the respective dataflow components 6, in function of their respective total latency Δt (Step S3). Determining the serving rate p associated with the ingress messages rate 1/β is for example based on modeling a processing node 2 as a D/M/1 queuing system, consisting of a queue (that abstracts all queuing effects including software queuing and network handling) fed by a constant bitrate message source, and served by a dataflow component 6 of which the serving rate follows a Poisson distribution.

In a D/M/1 queuing system, the total latency is the sum of a queuing latency Qlatency and a processing latency Platency:

$$Q\text{latency}=(1/\mu)\delta/(1-\delta) \quad (1a)(\text{from D/M/1 model})$$

$$P\text{latency}=1/\mu \quad (1b)(\text{from Poisson distribution})$$

giving:

$$\text{Total latency}=(1/\mu)*(1+\delta/(1-\delta)) \quad (1)$$

with δ the smallest root of the equation $$\delta=e-\mu\beta(1-\delta) \quad (2)$$

wherein μ is the rate parameter for the Poisson distribution and 1/β is the ingress message rate.

The total latency has been determined at step S2 and the ingress message rate 1/β specified at step S1. That gives us a system of 2 non-linear equations in the two unknowns μ and δ, which can be solved under the stability condition that μβ>1. Accordingly, for a given ingress message rate 1/β, it is possible to determine the serving rate μ in function of the total latency Δt.

Steps S1 to S3 are repeated for successive increasing values of the ingress message rate 1/β. Accordingly, the successive ingress message rates 1/β define a staircase profile. For example, the scheduling device 4 starts with an arbitrary low ingress message rate 1/β, then take the resulting calculated serving rate μ as next ingress message rate.

After some iteration of steps S1 to S3, the scheduling device 4 will be unable to determine a serving rate μ because the above equations system will be unsolvable. The last determined serving rate μ is then selected as maximum serving rate $\mu_{max}$.

In an experiment, a rather simple dataflow component 6 implementing essentially a "projection" operator in nodejs has been characterized using this method. The ingress messages were sent with a timer resolution of about 1 ms directly out of a data broker device 3, handled by the projection operator deployed on the processing node 2 and captured again inside the data broker device 3. At the same time, we measured the internal time delay over the "projection" callback through more intrusive means, for study purposes, which determined processing latencies in the range of [0.0005, 0.0007] s.

It is clear from this setup that all the possibilities for queuing are to be expected in this experiment. It might be surprising for a reader not familiar with queuing theory how dominant the effect of queuing is in the collected results—we will later give some insights to make this better understandable . . . .

The following table shows the serving rates μ determined for respective ingress message rates 1/β, in function of the measured total latency Δt. The maximum serving rate $\mu_{max}$ is 1846.6.

| 1/β | μ |
|---|---|
| 10 | 732.66 |
| 209 | 807.16 |
| 408 | 865.26 |
| 607 | 919.85 |
| 806 | 1164.4 |
| 1005 | 1191.2 |
| 1204 | 1573.5 |
| 1403 | 1719.5 |
| 1602 | 1846.6 |
| 1801 | Fail |

The following remarks may be made:
1) We do not find a single p for each run. This can be due to the fact that the choice of Poisson as a distribution is not fully warranted (obviously . . . ) but could also be an effect of the high optimization going on on the nodejs v8 interpreter as the code loop executes more times for each subsequent experiment, and better code cache hit rates when messages are arriving fast after each other—both of these effects would occur in a real system too, so should not be considered a flaw of this methodology. What this means is that under high load, we should use processor latencies derived from p in the [1573, 1847] fps range, fitting very well with the latency measurements of [0.0005, 0.0007] s.
2) Apart from the rate-dependant variations above, this methodology is rather insensitive at the precise incoming rate used in the experiment. This means that in a pipeline that consists of a multitude of operators, it is not a problem that operators far from the external stimuli are not tested close to their serving rate (which is in general only easy to do for the first operator directly connected to the external stimuli).
3) The solution of the linear equations consistently works when incoming rate is below maximum serving rate, and fails to converge above that stability point—a super simple criteria to find the maximum server rate.
4) The serving rate as established by the run at 1602 pps (1846.6) agrees very well with the fact that at 1801 pps, our equations become unsolvable (since we are at the bounds given by the stability criteria—incoming rate is equal or above serving rate and the queue will grow towards infinity)
5) This show that it is possible to derive processing rates/latencies without having to instrument the processing code, by just observing packet trace times on the data broker device 3.
6) This approach assumes that a dataflow component 6 is event driven, only spending compute effort when messages are coming in at the input channels of the node—this is valid throughout common distributed computing architectures, apart from effects due to INT handling, kernel preemption and user level garbage collection, which can be modeled as noise on the predominantly deterministic processing cycle requirements of the nodes—latency now becomes a probability distribution i.s.o. a deterministic value.

In the scheduling phase, the scheduler device 4 aims at limiting the queueing latency to a small ratio of the processing latency, in order to achieve soft-real-time requirement. From the D/M/n queuing system theory, this can be expressed as a threshold on the processor utilization, as illustrated by the following table:

| processor utilization | queueing_latency/ processing_latency ratio | |
|---|---|---|
| | fixed IAT | random IAT |
| 0 | 0 | 0 |
| 0.1 | 0 | 0.11 |
| 0.2 | 0.01 | 0.25 |
| 0.3 | 0.04 | 0.43 |
| 0.4 | 0.12 | 0.67 |
| 0.5 | 0.26 | 1.0 |
| 0.6 | 0.48 | 1.5 |
| 0.7 | 0.88 | 2.33 |
| 0.8 | 1.69 | 4.0 |
| 0.9 | 4.18 | 9.0 |
| 1.0 | infinite | infinite |

For example, by limiting the processor utilization to 30%, the queueing_latency/processing_latency ratio will remain below 0.04 in the case of fixed inter arrival time of messages.

Accordingly, for a given ingress flow having an ingress message rate 1/β, the scheduling device 4 determines processor utilization of a dataflow component 6 in function of its maximum serving rates $\mu_{max}$ determined by the characterization phase (step T1). More specifically, for the determined maximum serving rate $\mu_{max}$ of the dataflow component 6, $1/\mu_{max}$ can be interpreted as the time the processor spends processing a single message, which directly translates to the amount of machine cycles that are required to handle a single message. Accordingly, the processor utilization of the dataflow component 6 can be determined.

Then, the scheduling device 4 selects a processing device 5 for running the dataflow component 6 (step T2), in function of the processor utilization determined at step T1. Based on the queuing theory discussed above, the scheduling device 4 checks that the sum of the current processor utilization of a processing device 5 and the processor utilization of the dataflow component 6 remains below a given threshold, for example 30%. Additional criteria and rules may be used, for example to select between different processing devices 5 which satisfy the processor utilization limit. By doing that, the scheduling device 4 can guarantee that the end-to-end delay experienced by messages flowing through the system 1 will be predominantly determined by the processing latency, which we have rather accurately established from measurements that did not need invasive probing in the processors.

Finally, the scheduling device 4 applies the determined schedule (step T3). Accordingly, the scheduling device 4 controls execution of the dataflow component 6 on the processing device 5 selected at step T2.

Steps T1-T3 may be executed for all the dataflow components 6 which have been characterized during the characterization phase, for example in parallel or sequentially. If some of the dataflow components 6 have not been characterized, other scheduling criteria and rules may be used. This results in scheduling the entire dataflow.

In some embodiments, during execution of the dataflow, the scheduling device 4 monitors the ingress flow. In case the message rate changes, the scheduling device 4 may decide to kick out the dataflow so that processor utilization stays within limits.

Note that the limit of 30% utilization is significantly below another limit that can be derived purely from looking at the capabilities of a thread scheduler that is used to multitask multiple operators on a particular processing core, which is more in the ballpark of max 70% utilization to guarantee optimal scheduling.

In the system 1, the maximum serving rate $\mu_{max}$ of dataflow components 6 may be determined without the need of intrusive measures such as instrumenting the execution code. Moreover, based on the determined maximum serving rate $\mu_{max}$ and on hindsight from the queuing theory, the scheduling device 4 may schedule the dataflow components 6 of a distributed dataflow while limiting the queuing latency, thereby satisfying soft-real-time requirements.

Figure 3:
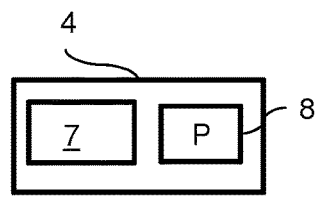
FIG. 3 is structural view of a scheduling device for executing the method of FIG. 2.

FIG. 3 is a structural view of the scheduling device 4, which comprises a processor 7 and a memory 8. The memory 8 stores a computer program P which, when executed by the processor 7, causes the scheduling device 4 to execute the method described above with reference to FIG. 2.

In some embodiment, some of the functions of the data broker device 3 may be performed by the scheduling device 4. Say otherwise, the data broker device 3 and the scheduling device 4 have been described as two distinct devices, but may be partially or fully combined in some embodiments.

In some embodiments, the dataflow may comprise only one dataflow component 6. In other words, a dataflow component 6 may be generally regarded as a software module where processing load is a characterizable function of input load.

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represents various processes which may be substantially represented in computer readable medium and so executed by a computer or processor, whether or not such computer or processor is explicitly shown.

Embodiments of the method can be performed by means of dedicated hardware and/of software or any combination of both.

While the principles of the invention have been described above in connection with specific embodiments, it is to be clearly understood that this description is made only by way of example and not as a limitation on the scope of the invention, as defined in the appended claims.

The invention claimed is:

1. A method for scheduling, by a scheduling device, at least one dataflow component of a distributed dataflow, wherein scheduling the at least one dataflow component comprises assigning a processing device out of a plurality of processing devices to the at least one dataflow component, the method comprising repeating at least the following for successive increasing input message rates (1/β) until the scheduling device is unable to determine a serving rate (μ) associated with an ingress message rate (1/β), thereby determining a maximum serving rate for at least one dataflow component:

applying an ingress message flow at the ingress message rate (1/β) to the distributed dataflow comprising the at least one dataflow component executed by respective processing devices, determining a total latency (Δt) of the at least one of dataflow component, and determining a serving rate (μ) associated with the ingress message rate (1/β) for the at least one dataflow component as a function of the ingress message rate (1/β) and the total latency (Δt), wherein the scheduling further comprises scheduling the at least one dataflow component as a function of the determined maximum serving rate, wherein the scheduling of the at least one dataflow component further comprises determining a processor utilization of the at least one dataflow component as a function of the determined maximum serving rate, and selecting the processing device such that a sum of a current processor utilization of the processing device and the determined processor utilization of the at least one dataflow component is below a predetermined threshold.

2. The method according to claim 1, wherein the maximum serving rate is a last serving rate determined before the scheduling device is unable to determine the serving rate (μ).

3. The method according to claim 1, wherein determining the total latency (Δt) comprises identifying an input message associated with an output message of the at least one dataflow component, and determining a time lapse between the input message and the output message.

4. The method according to claim 1, comprising selecting the ingress message rate (1/β) equal to the serving rate associated with a prior ingress message rate (1/β).

5. The method according to claim 1, wherein determining the serving rate (μ) comprises solving an equations system modeling the total latency as a sum of a queuing latency and a processing latency in a D/M/1 queuing system.

6. An apparatus for scheduling dataflow components of a distributed dataflow, wherein the apparatus comprises at least one processor and at least one memory including instructions which when executed by the at least one processor configure the apparatus to at least schedule at least one a dataflow component by at least assigning a processing device out of a plurality of processing devices to the at least one dataflow component, the apparatus further-configured to repeat at least the following for successive increasing input message rates (1/β) until the scheduling device is unable to determine a serving rate (μ) associated with an ingress message rate (1/β), thereby determining a maximum serving rate for the at least one dataflow component (6):

applying an ingress message flow (F1) at the ingress message rate (1/β) to the distributed dataflow comprising the at least one dataflow component executed by respective processing devices, determining a total latency ($\Delta t$) of at least one of dataflow component, and determining a serving rate ($\mu$) associated with the ingress message rate ($1/\beta$) for the at least one dataflow component as a function of the ingress message rate ($1/\beta$) and the total latency ($\Delta t$), wherein the scheduling further comprises scheduling the at least one dataflow component as a function of the determined maximum serving rate, wherein the scheduling of the at least one dataflow component further comprises determining a processor utilization of the at least one dataflow component as a function of the determined maximum serving rate, and selecting the processing device such that a sum of a current processor utilization of the processing device and the determined processor utilization of the at least one dataflow component is below a predetermined threshold.

7. The apparatus of claim 6, wherein the maximum serving rate is a last serving rate determined before the scheduling device is unable to determine the serving rate ($\mu$).

8. The apparatus of claim 6, wherein determining the total latency ($\Delta t$) comprises identifying an input message associated with an output message of the at least one dataflow component, and determining a time lapse between the input message and the output message.

9. The apparatus of claim 6, wherein the ingress message rate ($1/\beta$) is select to be equal to the serving rate associated with a prior ingress message rate ($1/\beta$).

10. The apparatus of claim 6, wherein determining the serving rate ($\mu$) comprises solving an equations system modeling the total latency as a sum of a queuing latency and a processing latency in a D/M/1 queuing system.

\* \* \* \* \*